United States Patent
Dever et al.

(10) Patent No.: US 6,262,310 B1
(45) Date of Patent: *Jul. 17, 2001

(54) HALOGEN-FREE, DEPOSIT-CONTROL FUEL ADDITIVES COMPRISING A HYDROXYPOLYALKENE AMINE, AND A PROCESS FOR ITS PRODUCTION

(75) Inventors: James L. Dever, Copley; Larry J. Baldwin, Berea, both of OH (US); Cyril J. Yaggi, Whiting, IN (US)

(73) Assignee: Ferro Corporation, Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,647

(22) Filed: Nov. 26, 1997

Related U.S. Application Data

(63) Continuation of application No. 07/835,541, filed on Feb. 14, 1992, now abandoned, which is a continuation-in-part of application No. 07/661,710, filed on Feb. 26, 1991, now abandoned.

(51) Int. Cl.$^7$ .................................................. C07C 213/00
(52) U.S. Cl. .......................................... 564/477; 564/503
(58) Field of Search ........................... 44/433, 412, 434; 564/477, 503

(56) References Cited

U.S. PATENT DOCUMENTS

| | | | |
|---|---|---|---|
| 1,920,578 | 8/1933 | Matzow | 22/126 |
| 2,373,199 * | 4/1945 | Schwoegler et al. | 564/477 |
| 2,498,195 | 2/1950 | Ballard et al. | 252/584 |
| 2,522,155 | 9/1950 | Ballard et al. | 252/51.5 |
| 2,602,819 | 7/1952 | Huscher et al. | 260/584 |
| 2,856,363 | 10/1958 | Brennan | 252/33.6 |
| 3,793,203 | 2/1974 | Drisscoll et al. | 252/56 |
| 3,794,586 * | 2/1974 | Kimura et al. | 508/556 |
| 3,898,056 | 8/1975 | Honnen | 44/58 |
| 3,931,024 | 1/1976 | Hu | 252/51.5 |
| 4,055,402 | 10/1977 | Battersby et al. | 44/58 |
| 4,108,613 | 8/1978 | Frost, Jr. | 44/58 |
| 4,123,232 | 10/1978 | Frost, Jr. | 44/72 |
| 4,302,215 | 11/1981 | Lewis | 44/71 |
| 4,302,354 | 11/1981 | Giede et al. | 252/392 |
| 4,353,711 | 10/1982 | Childs | 44/63 |
| 4,410,335 | 10/1983 | Childs | 44/72 |
| 4,549,882 | 10/1985 | Knapp | 44/53 |
| 4,832,702 | 5/1989 | Kummer et al. | 44/62 |
| 4,943,381 | 7/1990 | Phillips et al. | 252/51.5 |
| 5,068,046 | 11/1991 | Blain et al. | 252/51.5 |

FOREIGN PATENT DOCUMENTS

| | | |
|---|---|---|
| 2050967 | 3/1992 | (CA) . |
| 25 202 67 | 11/1976 | (DE) . |
| 0 385 039 | 5/1990 | (EP) . |
| 0 384 086 | 8/1990 | (EP) . |
| 0 476 485 | 3/1992 | (EP) . |
| WO 92/12221 | 7/1992 | (WO) . |

OTHER PUBLICATIONS

"Modern Synthetic Reactions", Robert O. House, 1965, pp. 105–106 Month Unavailable.

"Oxidations in Organic Chemistry", M. Hudlickv, 1990 pp. 10–12 Month Unavailable.

Daniel Swern, *Organic Peroxides,* vol. 1, Wiley–Interscience, John Wiley & Sons, New York, 1970, pp. 340–369.

Joseph P. Kennedy, *Carbocationic Polymerization,* Wiley–Interscience, John Wiley & Sons, New York, pp. 468–503. Date Unknown.

Sandor Memes, Jiaoshi Si, and Joseph P. Kennedy, "C NMR Chemical Shifts of Polyisobutylene End Groups and Related Model Compounds," *Polymer Bulletin 23,* Institute of Polymer Science, The University of Akron, 1990, pp 597–603.

A.H. Turner, "Purity Aspects of Higher Alpha Olefins, "*JAOCS,* vol. 60., No. 3, Mar. 1983, pp. 623–627.

W.T. Riddick, "Reaction of Actipols with Hydroxyl Compounds; Method for Determination of Epoxide, Carbonyl, and Hydroxyl Content of Actipols, "*Technical Service Report No. 90–92,* Amoco Chemical Company, 1990.

* cited by examiner

*Primary Examiner*—Margaret Medley
(74) *Attorney, Agent, or Firm*—Renner, Kenner, Greive, Bobak, Taylor & Weber

(57) ABSTRACT

A halogen-free hydroxypolyalkene amine composition and a process for production thereof is disclosed. The halogen-free composition is made by epoxidizing polyalkene to form an epoxy intermediate which is subsequently reacted with an excess of an amine compound. Generally, the end product composition contains a plurality of different types of hydroxypolyalkene amines. Such compositions are useful as deposit-control fuel additives.

9 Claims, No Drawings

HALOGEN-FREE, DEPOSIT-CONTROL FUEL ADDITIVES COMPRISING A HYDROXYPOLYALKENE AMINE, AND A PROCESS FOR ITS PRODUCTION

CROSS-REFERENCE

This application is a Continued Prosecution Application of U.S. Ser. No. 08/979,647, filed Nov. 26, 1997, now abandoned, which in turn is a continuation of application U.S. Ser. No. 07/835,541, filed Feb. 14, 1992, now abandoned, which in turn is a continuation in part of application U.S. Ser. No. 07/661,710, filed Feb. 26, 1991, now abandoned.

FIELD OF THE INVENTION

The invention relates generally to deposit-control fuel additives which are free from halogen, and more particularly to hydroxypolyalkene amines, such as hydroxypolybutene amines and hydroxypolypropylene amines, as well as to a generally multiple-step process for their production.

BACKGROUND OF THE INVENTION

Deposit-control fuel additives effectively control deposits in engine intake systems (carburetors, valves, fuel injectors, etc.). A major deposit-control fuel additive used in gasoline today is made by the chlorination of polybutene to produce an intermediate followed by the reaction of this intermediate with an amine compound to produce a polybutene amine. These polybutene amines typically contain from about 0.5 to about 1.0 percent residual chlorine, and seldom less than 0.25 percent chlorine. With today's concerns regarding halogen compounds, it is desirable to reduce or eliminate chlorine from fuel additives.

The present invention relates to halogen-free hydroxypolyalkene amine fuel additives. This fuel additive is produced through the epoxidation of a polyalkene followed by the reaction of the epoxypolyalkene with an amine to produce a hydroxypolyalkene amine.

U.S. Pat. No. 4,302,215 to Lewis relates to hydrocarbyl carbonates and their fuel compositions which are deposit-control additives in gasoline compositions.

U.S. Pat. No. 3,794,586 to Kimura et al. relates to a lubricating oil composition containing a hydroxyalkyl-substituted polyolefin prepared by reacting a polyalkene epoxide with a polyamine at a temperature of from 15 to 180° C.

European Patent Application No. 384,086 to Blackborrow et al. relates to a process for producing long chain alkyl amines from polyolefins by reacting (a) a polyolefin having a molecular weight in the range of 330–2000 with ozone in the presence of a solvent, (b) reacting the ozonolysis product from (a) without separation and/or isolation of the carbonyl compounds formed therein with a primary hydrocarbyl amines to form an imine, (c) hydrogenating the imine from step (b) to give an amine in the presence of a hydrogenation catalyst, and (d) recovering the long chain alkyl amine from the hydrogenation products formed in step (c).

European Patent Application No. 385,039 to Blackborrow relates to a process for producing active carbonyl compounds predominating in aldehyde groups from polybutene having at least 50 percent of the unsaturation in the terminal position. The process has an initial epoxidation of the polybutene followed by isomerization of the epoxide so formed at a relatively higher temperature. The active nature of the carbonyl group enables these compounds to be converted to the corresponding amines or imines which can be used as fuel and lube oil additives.

SUMMARY OF THE INVENTION

The present invention relates to halogen-free hydroxypolyalkene amines such as hydroxypolybutene amines and hydroxypolypropylene amines and to a process for their production, and to a fuel containing such amines as a fuel additive.

The structure of the hydroxypolyalkene amines is generally a function of the end group structure of the polyalkene and generally several such structures exist for each polyalkene compound. The following are examples of some of the end group structures in polybutene and the hydroxypolybutene amines generally derived therefrom.

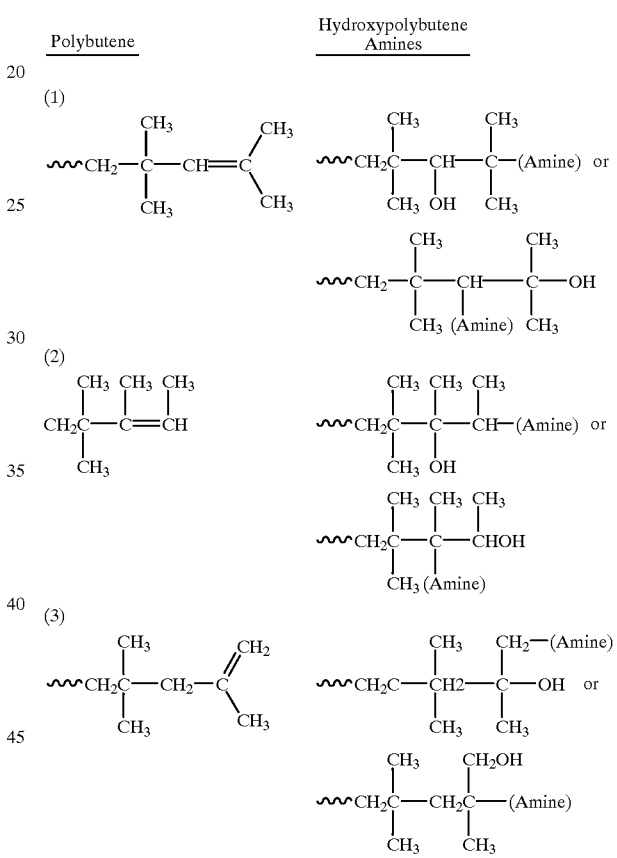

The following examples are some of the end-group structures of polypropylenes and the hydroxypolypropylene amines generally derived therefrom.

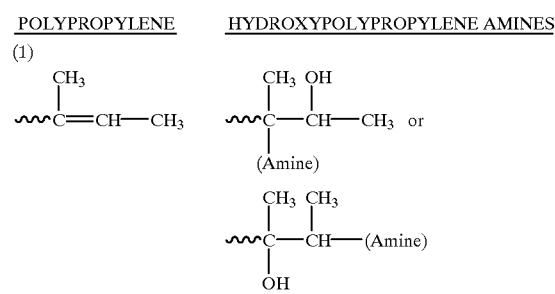

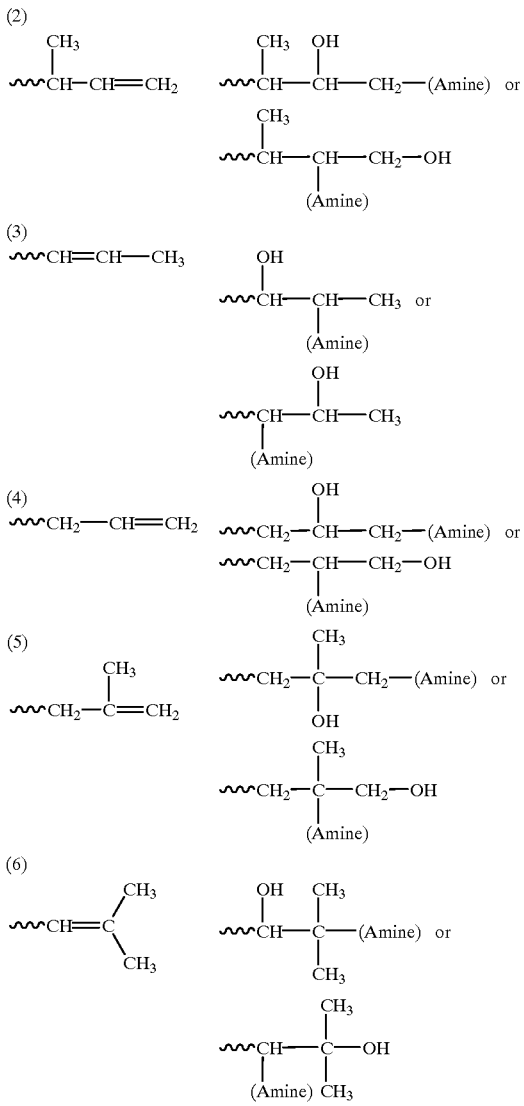

Cationically polymerized polypropylene suitable for use in this invention contains several different end-group structures resulting from extensive rearrangement during manufacturing. These end-group structures are represented as 3 or 4 carbon atom-terminated polypropylenes in the preceding structures. When 4 carbon atom-terminated structures are involved, such is due to alkyl group migration from one of the preceding repeat units.

A generic representation of the hydroxypolyalkene amine is:

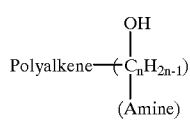

where n=3 or 4, where Polyalkene is polypropylene or polybutene, and where, as apparent from the above formulations, the hydroxyl group and the amine group are always attached to adjacent, i.e., an adjoining or contiguous carbon atom.

The hydroxypolyalkene amines of the present invention are produced by a multiple-step process in which a polyalkene is first epoxidized in a suitable solvent using hydrogen peroxide in the presence of an organic acid. The intermediate epoxide is subsequently treated with a primary or secondary amine compound which may be a monoamine, a diamine, or a polyamine causing addition of the amine compound to the polyalkene epoxide intermediate. This addition reaction is run either neat or in a suitable solvent with an excess of amine at a temperature of from about 185° C. to about 300° C. The excess amine and solvent, if present, are removed from the final hydroxypolyalkene amine product by any conventional procedure such as vacuum stripping, wiped film evaporation, or a combination of vacuum stripping and water washing.

DETAILED DESCRIPTION OF THE INVENTION

In accordance with the present invention, a process for making a halogen-free hydroxypolyalkene amine product generally of the formula

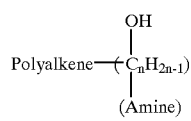

where n=3 or 4, where Polyalkene is cationically polymerized polypropylene or polybutene, and where the hydroxyl group and the amine group are attached to adjacent carbon atoms. That is, the amine group is attached to one carbon atom which is connected to the next or contiguous carbon atom which has the hydroxyl group thereon. Due to the large number of possible isomers, a single generic formula with amine on one carbon atom and the hydroxyl group on the next carbon atom cannot be drawn, rather specific examples have been set forth hereinabove and below.

The amine substitution is fully described hereinbelow in a multiple-step process comprising an epoxidation step, followed by the addition of an amine compound to the intermediate epoxide thus produced. In the first step, a polyalkene is epoxidized. The polyalkene can be any polyalkene known to the art and to the literature with the initial alkene monomer containing 3 or 4 carbon atoms, with 4 carbon atoms being highly preferred.

Polybutene is the commercial name for polymers manufactured from $C_4$ olefin refinery streams of catalytic or steam-cracked petroleum. These $C_4$ fractions consist mainly of isobutylene, but also contain other $C_4$ olefins. The definition of polybutene is well known to those skilled in the art, and is described in "Carbocationic Polymerization" by J. P. Kennedy and E. Marechal, Wiley-Interscience, New York, N.Y., 1982, pp. 469–475, which is hereby fully incorporated by reference. When the halogen-free hydroxypolyalkene amine product is made from a polybutene, the end product has the general formula

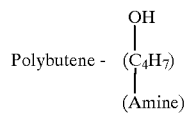

Specific examples of various isomers of such products is set forth hereinabove.

Polypropylene is the commercial name for polymers manufactured from $C_3$ olefin refinery streams of catalytic or steam-cracked petroleum. In the manufacture of polypropylene utilizing cationic polymerization, there is opportunity for carbon atom rearrangement. Thus, a generic formula cannot be set forth inasmuch as the polypropylene end group structure will contain one unsaturated point within the three or four terminal carbon atoms as set forth above in the various formulas. The definition of polypropylene, as well as the end group structures thereof which are predominantly branched, are set forth and described in "J. Org. Chem. 49," I. Puskas and S. Meyers, 258 (1984), and "Macromolecules, 12" I. Puskas, E. M. Banas, A. G. Nerheim, and G. J. Ray, 1024 (1979), which are hereby fully incorporated by reference.

The initial step of the preparation of the compositions of the present invention is the epoxidation of a polyalkene. When the polyalkene is polybutene, it desirably has a number average molecular weight of from about 400 or 450 to about 2,200, preferably from about 700 to 1,600, and most preferably from about 800 to about 1,400, and a degree of polymerization of from about 7 or 8 to about 40, desirably from 12 to 29 and preferably from about 14 to about 25. When the polyalkene is polypropylene, it desirably has a number average molecular weight of from about 170 to about 1720, and preferably from about 260 to about 1290, and a degree of polymerization of from about 4 to about 40, and desirably from about 6 to about 30. More generally, are the number average molecular weight of the polypropylene is desirably from about 290 or 330 to about 1900 or 2200, more desirably from about 460 to about 1720, and preferably from about 630 to about 1290, that is a degree of polymerization of from about 7 or 8 to about 40 or 52, desirably from about 11 to about 40, and preferably from about 15 to about 30.

The epoxidation reaction occurs by reacting polyalkene with hydrogen peroxide as well as an organic carboxylic acid in the presence of an acid catalyst. The organic carboxylic acid reacts with the hydrogen peroxide to form an intermediate peroxy acid which reacts with the polyalkene and subsequently forms an epoxidized polyalkene with regeneration of the organic carboxylic acid. Due to the high viscosity of the starting polyalkenes, the epoxidation reaction is desirably carried out in a hydrocarbon solvent. The amount of the hydrogen peroxide is generally from about 0.5 to about 2.5, and preferably from about 1.5 to about 2.0 moles per mole of polyalkene based upon the number average molecular weight of the polyalkene. The organic carboxylic acid is generally a monocarboxylic acid having a total of from 1 to 4 carbon atoms with acetic acid being preferred. The amount of the organic carboxylic acid is generally from about 0.15 to about 0.5 moles, and preferably from 0.25 to about 0.40 moles per mole of polyalkene based upon the number average molecular weight of the polyalkene. In addition to this organic carboxylic acid, an acid catalyst is also required. The acid catalyst can be one or more organic acids, or one or more inorganic acids, or combinations thereof which are utilized to effect the epoxide reaction. Such a reaction is described in *Organic Peroxides*, Vol. 1, Wiley-InterScience, New York, 1970, Daniel Swern, at pgs. 340–369, which is hereby fully incorporated by reference. Examples of specific acid catalysts include methanesulfonic acid, toluenesulfonic acid, sulfuric acid, phosphoric acid, and the like and are utilized in small amounts as from about 0.0025 to about 0.030 moles per mole of polyalkene based upon the number average molecular weight thereof.

The hydrocarbon solvent utilized in the polyalkene epoxidation reaction can generally be any inert organic solvent, that is a solvent which does not enter into reaction with any of the reactants. Such solvents include aromatic solvents having a total of from about 6 to about 9 carbon atoms with specific examples including xylene, toluene, $C_9$ aromatic, and the like, an aliphatic solvent having from about 6 to about 10 carbon atoms with specific examples including isooctane, heptane, cyclohexane, and the like, or various aliphatic substituted aromatic compounds, and the like, as well as combinations thereof.

The temperature of the epoxidation reaction will depend on the organic acid used and is a function of the stability of the intermediate peracid and the reaction rate thereof. For acetic acid, the reaction temperature is generally from about 60° C. to about 85° C., desirably from about 75° C. to about 85° C., and preferably from about 78° C. to 82° C. For formic acid, the reaction temperature is generally from about 40° C. to about 60° C., preferably from about 45° C. to about 55° C., and most preferably from about 48° C. to about 52° C. Suitable reaction temperatures for other organic carboxylic acid reactants will range according to the stability of the intermediate peracid and their reactivity, i.e. the reasons set forth hereinabove. Inasmuch as the reaction is exothermic, it is generally necessary to cool the reaction after it has commenced to maintain the temperature within the above ranges. The reaction is generally conducted at atmospheric pressure, preferably under an inert atmosphere such as nitrogen.

Examples of only some of the different types of intermediate polybutene epoxides which are produced according to the present invention are set forth by the following reaction illustrations.

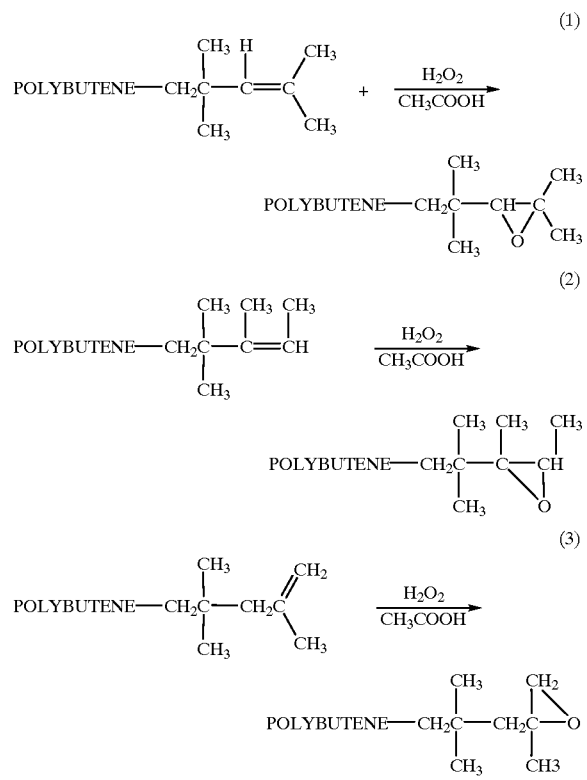

Due to the high reactivity of the type 3 epoxides shown above toward amination, these polybutene epoxide intermediates are preferred. Type 3 epoxides are produced starting with polybutenes containing high concentrations of type 3 starting polybutenes. An example of such a commercially available polybutene is Ultravis 30®, produced by British Petroleum. Examples of commercially available polybutenes having predominately the above type 1 end group structure include Hyvis® which is a product by British Petroleum and Parapol® which is produced by Exxon.

Examples of some of the different types of intermediate polypropylene epoxides which are produced according to the present invention are set forth by the following reaction illustrations.

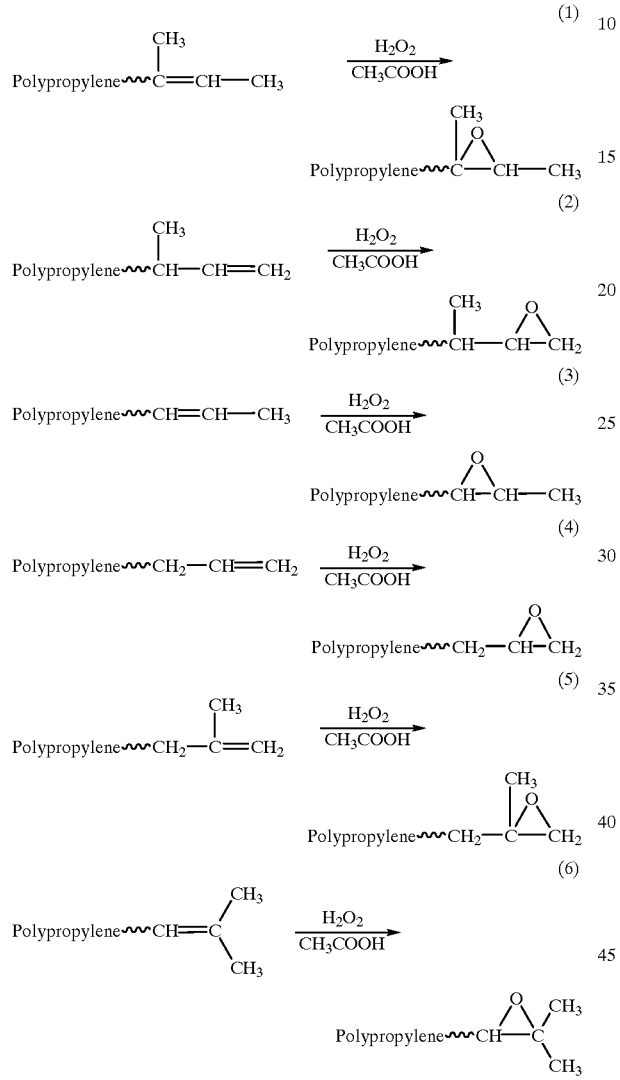

Due to the generally high reactivity of the above shown types 2 and 4 epoxides toward amination, these polypropylene epoxide intermediates are preferred. Types 2 and 4 epoxides are produced starting with polypropylenes containing high concentrations of the types 2 and 4 starting polypropylenes.

The degree of epoxidation is a function of the polyalkene end group structure and typically is at least 60, 70, or 75 percent.

The epoxide reaction product is a viscous colorless to light yellow liquid which can be isolated by removal of the solvent by a variety of conventional techniques such as vacuum stripping, wiped film evaporation, and the like. The resulting intermediate product can be used without further purification in the subsequent amination step.

In a subsequent step of the process, the epoxy ring is opened by the amine compound to form the hydroxypolyalkene amine product. The amine compound can be a primary amine or a secondary amine compound but not a tertiary amine compound and more specifically can be a monoamine, a diamine, or a polyamine (that is 3 or more amine groups). The amine compounds useful in preparing the hydroxypolyalkene amine compounds of the present invention, such as the various hydroxypolybutene amine compounds, are various monoamines, diamines, and polyamines such as cyclic diamines and polyamines, and alkylene diamines and polyamines of the formula

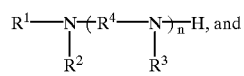

and cyclic monoamines and monoamines of the formula

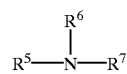

wherein each of $R^1$, $R^2$, $R^3$, $R^5$, $R^6$ and $R^7$, independently, is a hydrogen atom or a hydrocarbyl radical containing from 1 to about 40 carbon atoms, provided however, that at least one of $R^5$, $R^6$ and $R^7$, independently, is said hydrocarbyl, at least one of $R^5$, $R^6$ and $R^7$ is hydrogen, $R^4$ is a divalent hydrocarbon radical containing from 1 to about 18 carbon atoms and n is an integer from 1 to about 10. Generally these hydrocarbyl radicals are aliphatic radicals free from acetylenic unsaturation and contain from 1 to about 10 carbon atoms. Examples of such various amine compounds include methylene polyamines, ethylene polyamines, butylene polyamines, propylene polyamines, pentylene polyamines, etc., cyclic polyamines such as piperazines and N-aminoalkyl substituted piperazines, and the like. Specific non-limiting representative examples of such polyamines also include ethylenediamine, diethylenetriamine, triethylenetetramine, tris-(2-aminoethyl)-amine, propylenediamine, trimethylenediamine, tripropylaminetetramine, tetraethylenepentamine, and heptaethylenehexamine.

Among the monoamines useful in this invention are those of the formula $HNR^8R^9$ wherein $R^8$ is an alkyl radical of up to 10 carbon atoms and $R^9$ is hydrogen atom or an alkyl radical of up to 10 carbon atoms. Examples of suitable monoamines are ethylamine, diethylamine, n-butylamine, di-n-butylamine, allylamine, isobutylamine, cocoamine, stearylamine, laurylamine, and methyllaurylamine, oleylamine.

Cyclic monoamines are also useful in making the compositions of this invention. The cyclic ring can be substituted with hydrocarbyl radicals such as alkyl or alkenyl. In addition, the ring can also contain other nitrogen atoms including those not having hydrogen atoms bonded to them. Generally, these rings have 3–10, preferably 5 or 6 ring members. Among such cyclic monoamines are aziridines, azetidines, azolidines, and piperidines.

Examples of preferred amine compounds include octylamine, nonylamine, decylamine, dodecylamine, ethylenediamine, propylenediamine, N,N-dimethylaminopropylamine, diethylenetriamine, triethylene-tetramine, and the like, with ethylenediamine, N,N-dimethylaminopropylamine, and diethylenetriamine being preferred. Inasmuch as a compound high in basic nitrogen is desired, diamines and polyamines are preferred.

It is an important aspect of the present invention to utilize an excess of the amine compound in order to obtain homogeneity of the reaction mixture, and reasonable reaction rates, and minimize reaction of more than one epoxide intermediate with the same nitrogen. The amount of the excess amine is from about 2 to about 20 moles of amine per mole of epoxide, desirably from about 4 to about 16, preferably from about 5 to about 12, and more preferably from about 8 to about 12.

The use of a catalyst to increase rates in the reaction of the amine compounds is optional. Such catalysts are known to the art as well as to the literature. Examples of such catalyst include alumina, titanium dioxide, methane sulfonic acid, paratoluenesulfonic acid, and the like. The amount of the catalyst is generally from about 1 to about 30, desirably from about 4 to about 20, and preferably from about 5 to about 10 weight percent based upon the total weight of the polyalkene epoxide.

It is an important aspect of the present invention to utilize a high temperature during reaction of the amine but the temperature must be below the depolymerization temperature of the epoxidized polyalkene. Such reaction temperature is generally from about 185° C. to about 290° C. or 300° C., more generally from about 230° C. to about 300° C. desirably from about 230° C. to about 285° C., and preferably from about 240° C. to about 280° C. The reaction can either be run in an open vessel under atmospheric conditions, or in a closed vessel under moderate pressure such as up to about 300, desirably from about 10 to about 70, and preferably from about 35 to about 55 psi. Reaction pressure will be a function of the partial pressures of the individual reaction components at the reaction temperature. Conversions of epoxide to amine of at least about 10 or 15 percent, desirably at least 50 percent, and preferably at least 70 percent are generally achieved.

In the case of all reactive monoamines, diamines, and polyamines, etc., at least one polyalkene epoxide molecule reacts with one amine molecule. In the case of diamines and polyamines containing more than one reactive amine group, the epoxide may react with any one of the reactive amine groups, producing a mixture of more than one type of a monohydroxypolyalkene amine. In the case of certain diamines, and polyamines, two polyalkene epoxide molecules may react with the same amine molecule to give a mixture of monohydroxypolyalkene amine and dihydroxypolyalkene amine products.

A general example of various monohydroxypolybutene amines obtained with the reaction of each of the general polybutene epoxide structural types set forth above with a polyamine, i.e., diethylenetriamine, is illustrated.

(1)

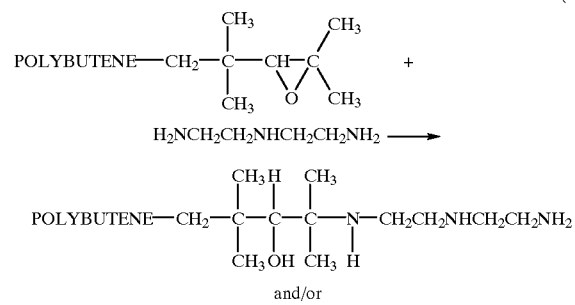

and/or

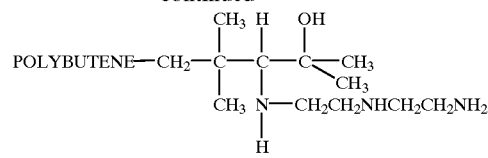

(2)

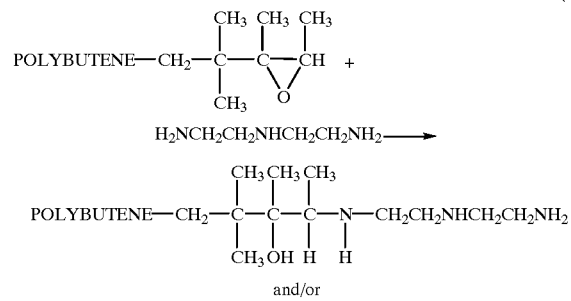

and/or

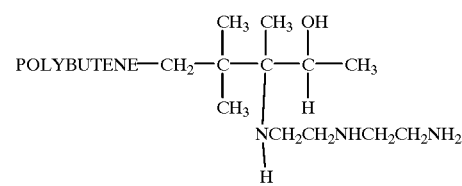

(3)

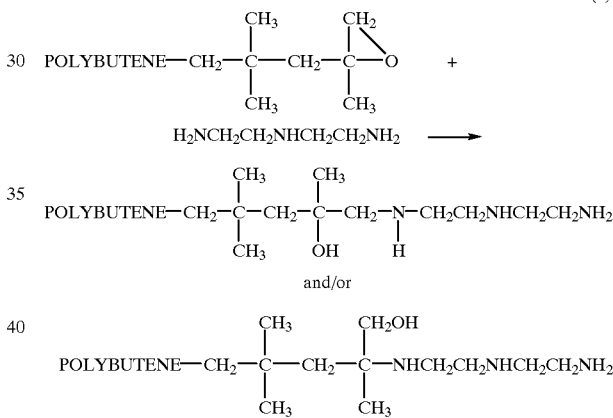

Examples of various monohydroxypolypropylene amines which are obtained from the reaction of each of the general polypropylene epoxide structural types set forth above with a polyamine, i.e., diethylenetriamine, is illustrated.

(1)

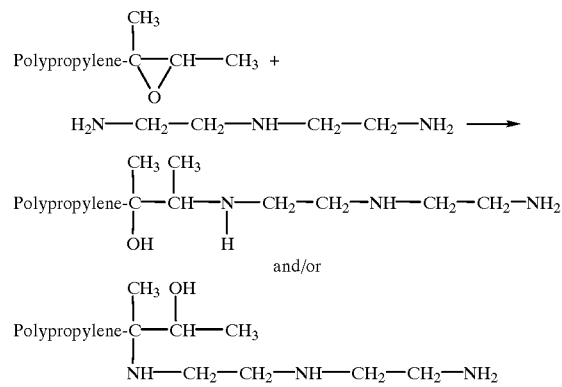

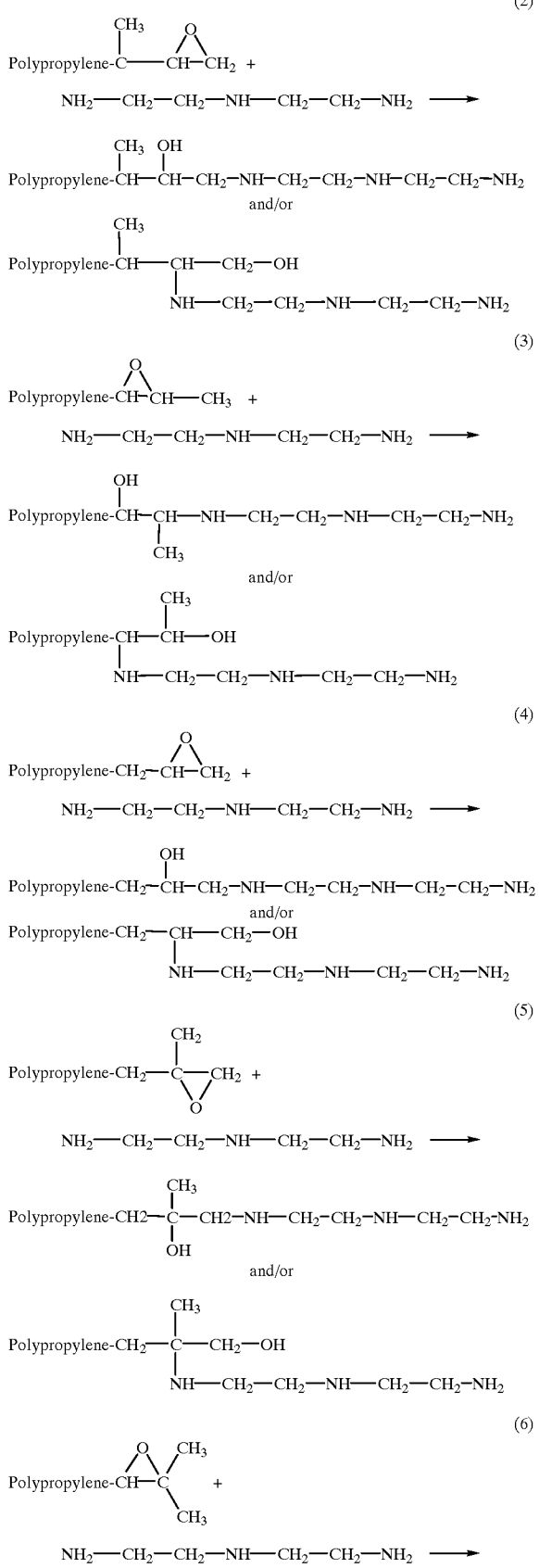

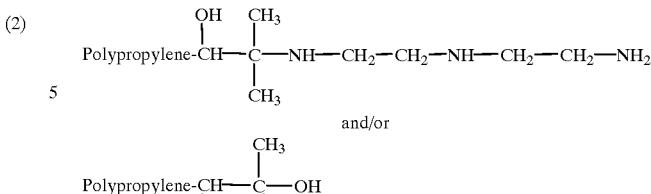

As apparent from the above representative formulas, many different types of end structures result. Thus, it should be apparent that numerous different structures of monohydroxypolybutene amines can result when an epoxide polybutene intermediate is reacted with only one terminal amine group of a polyamine. It should be apparent to one skilled in the art that with regard to the utilization of an epoxide polypropylene intermediate that numerous different types of structures of various mnonohydroxypolypropylene amines will also result.

An example of an additional monohydroxypolybutene amine product which can be formed from type 1 polybutene epoxide is shown, as follows.

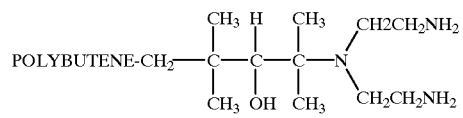

As apparent from the above structural formula, it should be apparent that various other types of monohydroxypolybutene amine products can be formed wherein the intermediate epoxy polybutene reacts with a non-terminal amine group. It is also possible that two or more polybutene epoxides can react with the same amine, but with the presence of a large excess of amine such reaction is minimized.

Inasmuch as free amines are generally detrimental to the use of a product of the present invention as a fuel additive, the excess amine is removed in any conventional manner such as by vacuum stripping, water washing, and the like. The amount of free amine contained in the halogen-free hydroxypolyalkene amine product solution is typically 0.2 percent by weight or less, and often 0.1 percent by weight or less. Once the excess amine compound has been removed from the hydroxypolyalkene amine product, it is usually diluted with an aromatic or non-aromatic solvent so that it is more convenient to handle. An aromatic solvent is preferred. Examples of such solvents include xylene and $C_9$ aromatic solvent. The product dilution depends on the desired additive concentration required in the formulated fuel. Such additive concentration levels are well known to the art as well as to the literature.

The halogen such as chlorine content of the various hydroxypolyalkene amine compounds of the present invention is nil. That is, unless some residual halogen exists within the equipment utilized, the halogen content is non-existent.

The dilute solution is added to the desired fuel. The fuel can be any conventional fuel, as well as any fuel known to the art and to the literature with specific examples including gasoline, diesel fuel, aviation fuel, marine fuel, and the like. The amount of the hydroxypolyalkene amine composition is an effective amount to reduce the deposit of a particular fuel to a desirable level. The exact level will vary from fuel to fuel, and also with regard to the current state or country environmental standards as well as from month to month or year to year, as new control standards are enacted.

Inoperability of U.S. Pat. No. 3,794,586

Since U.S. Pat. No. 3,794,586 relates to a lubricating oil composition supposedly containing a hydroxyalkyl-substituted polyamine as an alleged product, various examples thereof were duplicated as follows to determine if the same could be produced.

Duplication of Example 3 of U.S. Pat. No. 3,794,586

Reaction of tetraethylenepentaamine with Hyvis 30 Epoxide.

In a 1 L flask equipped with a reflux condenser were placed 130.39 of Hyvis 30 Epoxide (with 1 percent oxygen as oxirane) and 19.12 g of tetraethylenepentaamine. The reactants were dissolved in 500 ml of toluene. The reaction solution was blanketed with nitrogen and heated to reflux at approximately 110° C. After 4 hours, the reaction was cooled to room temperature.

At this point, the procedure in U.S. Pat. No. 3,794,586 simply involved atmospheric distillation to remove the toluene solvent. This procedure would leave any unreacted amine dissolved in the reaction residue. Subsequent, possibly superficial, analytical characterization could lead to the conclusion that reaction had actually occurred.

In order to eliminate this possibility, a series of water and acid washes were used. The toluene solution was then washed with 500 ml of water and then with 250 ml of 10 percent hydrochloric acid. The washes were employed to extract out any unreacted amine left in the residue while leaving any reaction residue in the toluene. The solvent was then stripped from the organic layer to yield 128 g of residue. This amount of residue corresponds to an essentially quantitative yield of unreacted starting material. A sample was submitted for percent basic nitrogen analysis. This revealed only 0.04 percent basic nitrogen. A sample of the residue was submitted for IR and NMR analysis. This sample was filtered to remove some salt-like material. The IR and NMR analysis of the precipitate indicated that these were salts of the starting amine, probably formed in the extraction washes. Neither NMR nor IR analyses revealed the presence of a hydrogen bonded to a nitrogen or any other evidence of amination.

Duplication of Example 4 of U.S. Pat. No. 3,794,586

Reaction of 1-(2-Aminoethyl)piperidine with Hyvis 30 Epoxide as per U.S. Pat. No. 3,794,586.

In a 1 L flask equipped with a reflux condenser were placed 130.5 g of Hyvis 30 Epoxide (with 1 percent oxygen as oxirane) and 13.8 g of 1-(2-amino-ethyl)-piperidine. The reactants were dissolved in 500 ml of toluene. This reaction solution was blanketed with nitrogen and heated to reflux (113° C.) for 4 hours.

As explained in the previous example, washing procedures were employed to remove residual, unreacted amine. The reaction was then cooled to room temperature, and the reaction was first washed with 200 ml of 10 percent hydrochloric acid and then with 200 ml of 10 percent potassium hydroxide solution. These washing procedures were used to insure that all of the unreacted amine was removed from the residue while leaving any reaction product in the toluene layer. The organic layer was then stripped of solvent. This reaction gave 129 g of residue. This amount of residue is consistent with an essentially quantitative recovery of the starting Hyvis 30. A sample was submitted for percent basic nitrogen and gave 0.14 percent basic nitrogen. A sample submitted for IR and NMR analysis was filtered to remove a precipitate. Analysis by IR and NMR of the precipitate indicated that this was a salt of 1-(2-aminoethyl)-piperidine. The analysis of the residue showed no indication of any nitrogen or any evidence of amination.

As apparent from the above examples, the results presented in U.S. Pat. No. 3,794,586 could not be achieved. Instead of a hydroxypolyalkene amine being produced, only a residue was obtained which under evaluation using IR and NMR revealed no nitrogen to hydrogen bonding or other evidence of amination.

In contrast thereto, applicants' invention which does obtain high yields of an aminated product will be better understood by reference to the following examples which are representative of present invention but do not limit the same.

EXAMPLE 1

Epoxidation of Parapol 1300®.

In a 5 L flask equipped with a mechanical stirrer, a reflux condenser, and an addition funnel were placed 1950 g of Parapol 1300, 975 g of heptane, and 27.0 g of glacial acetic acid. This solution was heated to 80° C. A mixture of 1.05 g of 85 percent phosphoric acid, 0.75 g of 50 percent sulfuric acid, and 145.7 g of 70 percent hydrogen peroxide was placed in the addition funnel. The peroxide solution was added drop-wise to the reaction mixture over a period of one hour. After the addition, the reaction was stirred at 80° C. for 6 hours. The reaction was then quenched with 1000 ml of water. The organic layer was then washed two additional times with 1000 ml of water. The organic layer was then stripped of the heptane to yield 1974 g of the Parapol 1300 epoxide with 1.29 percent oxygen as oxirane (near 100 percent conversion).

EXAMPLE 2

Epoxidation of Hyvis 30®.

In a 5 L flask equipped with a mechanical stirrer, a reflux condenser, and an addition funnel were placed 780 g of Hyvis 30, 390 g of heptane, and 14.8 g of glacial acetic acid. This solution was heated to 80° C. A mixture of 0.42 g of 85 percent phosphoric acid, 0.3 g of 50 percent sulfuric acid, and 58.29 g of 70 percent hydrogen peroxide was placed in the addition funnel. The peroxide solution was added drop-wise to the reaction mixture over a period of one hour. After the addition, the reaction was stirred at 80° C. for 6 hours. The reaction was then quenched with 400 ml of water. The organic layer was washed a further two times with 400 ml of water. The organic layer was then stripped of the heptane to yield 780.53 g of the Hyvis 30 epoxide with 0.98 percent oxygen as oxirane (81 percent conversion).

EXAMPLE 3

Epoxidation of Ultravis 30®.

In a 5 L flask equipped with a mechanical stirrer, a reflux condenser, and an addition funnel were placed 1950 g of Ultravis 30, 975 g of heptane, and 27 g of glacial acetic acid. This solution was heated to 80° C. A mixture of 1.05 g of 85 percent phosphoric acid, 0.75 g of 50 percent sulfuric acid, and 145.73 g of 70 percent hydrogen peroxide was placed in the addition funnel. The peroxide solution was added drop-wise to the reaction mixture over a period of one hour. After the addition, the reaction was stirred at 80° C. for 6 hours. The reaction was then quenched with 1000 ml of water. The organic layer was washed a further two times with 1000 ml of water. The organic layer was then stripped of the heptane to yield 1769.5 g of the Ultravis 30 epoxide with 0.90 percent oxygen as oxirane (74 percent conversion).

EXAMPLE 4

Epoxidation of Parapol 950®.

In a 5 L flask equipped with a mechanical stirrer, a reflux condenser, and an addition funnel were placed 780 g of Parapol 950, 390 g of heptane, and 14.8 g of glacial acetic acid. This solution was heated to 80° C. A mixture of 0.57 g of 85 percent phosphoric acid, 0.41 g of 50 percent sulfuric acid, and 79.9 g of 70 percent hydrogen peroxide was placed in the addition funnel. The peroxide solution was added drop-wise to the reaction mixture over a period of one hour. After the addition, the reaction was stirred at 80° C. for 6 hours. The reaction was then quenched with 400 ml of water. The organic layer was washed a further two times with 400 ml of water. The organic layer was then stripped of the heptane to yield 779.83 g of the Parapol 950 epoxide with 1.39 percent oxygen as oxirane (84 percent conversion).

EXAMPLE 5

Amination of Parapol 950® Epoxide (Ex. 4) with Dimethylaminopropylamine.

To a 1 L Parr bomb equipped with a mechanical stirrer were added 105 g of Parapol 950 epoxide (1.39 percent oxirane oxygen), 105 g of dimethylaminopropylamine, and 10.5 g of alumina. The vessel was closed and purged with nitrogen. The reaction was heated to 245° C. (130 psi) while stirring. This temperature was maintained for 18 hours. The reaction was then cooled to room temperature, and the reaction mixture was separated from the alumina catalyst. The reaction product was dissolved in 150 ml of chloroform and washed twice with 450 ml of water. The organic layer was stripped of solvent to yield 96 g of product with a percent basic nitrogen of 0.89 percent (40 percent conversion of available epoxide).

EXAMPLE 6

Amination of Ultravis 30® Epoxide (Ex. 3) with Dimethylaminopropylamine.

To a 1 L parr bomb equipped with a mechanical stirrer were added 97.9 g of Ultravis 30 epoxide (0.9 percent oxirane oxygen), 97.8 g of dimethylaminopropylamine, and 9.7 g of alumina. The vessel was closed and purged with nitrogen. The reaction was heated to 245° C. (130 psi) while stirring. This temperature was maintained for 18 hours. The reaction was then cooled to room temperature, and the reaction mixture was separated from the alumina catalyst. The reaction product was dissolved in 150 ml of chloroform and washed three times with 500 ml of water. The organic layer was stripped of solvent to yield 83 g of product with a percent basic nitrogen of 1.13 percent (75 percent conversion of available epoxide).

EXAMPLE 7

Amination of Parapol 950® Epoxide (Ex. 4) with Diethylenetriamine.

To a 1 L Parr bomb with a mechanical stirrer were added 102.8 g of Parapol 950 epoxide (1.39 percent oxirane oxygen), 102.9 g of diethylenetriamine, and 10.2 g of alumina. The vessel was closed and purged with nitrogen. The reaction was heated to 245° C. (40 psi) while stirring. This temperature was maintained for 18 hours. The reaction was then cooled to room temperature, and the reaction mixture was separated from the alumina catalyst. The reaction product was dissolved in 150 ml of chloroform and washed twice with 200 ml of water. The organic layer was stripped of solvent to yield 99.1 g of product with a percent basic nitrogen of 2.06 percent (61 percent conversion of available epoxide).

EXAMPLE 8

Amination of Ultravis 30® Epoxide (Ex. 3) with Diethylenetriamine.

To a 2 L Parr bomb equipped with a mechanical stirrer were added 657.9 g of Ultravis 30 epoxide (0.9 percent oxirane oxygen), 621.0 g of diethylenetriamine, and 63.0 g of alumina. The vessel was closed and purged with nitrogen. The reaction was heated to 245° C. (40 psi) while stirring. This temperature was maintained for 18 hours. The reaction was then cooled to room temperature, and the reaction mixture was separated from the alumina catalyst. The reaction product was dissolved in 500 ml of toluene and washed twice with 500 ml of water. The organic layer was stripped of solvent to yield 640 g of product with a percent basic nitrogen of 1.83 percent (81 percent conversion of available epoxide).

EXAMPLE 9

Amination of Parapol 1300® Epoxide (Ex. 1) with Diethylenetriamine.

To a 1 L Parr bomb equipped with a mechanical stirrer were added 223 g of Parapol 1300 epoxide (1.29 percent oxirane oxygen), 621.0 g of diethylenetriamine, and 21.9 g of alumina. The vessel was closed and purged with nitrogen. The reaction was heated to 245° C. (40 psi) while stirring. This temperature was maintained for 18 hours. The reaction was then cooled to room temperature, and the reaction mixture was separated from the alumina catalyst. The reaction product was dissolved in 300 ml of chloroform and washed twice with 400 ml of water. The organic layer was stripped of solvent to yield 215 g of product with a percent basic nitrogen of 1.65 percent (56 percent conversion of available epoxide).

EXAMPLE 10

Amination of Hyvis 30® Epoxide (Ex. 2) with Diethylenetriamine.

To a 1 L Parr bomb equipped with a mechanical stirrer were added 143.7 g of Hyvis 30 epoxide (0.98 percent oxirane oxygen), 67.1 g of diethylenetriamine, and 10 g of alumina. The vessel was closed and purged with nitrogen. The reaction was heated to 245° C. (40 psi) while stirring. This temperature was maintained for 18 hours. The reaction was then cooled to room temperature, and the reaction mixture was separated from the alumina catalyst. The reaction product was dissolved in 250 ml of chloroform and washed twice with 250 ml of water. The organic layer was stripped of solvent to yield.215 g of product with a percent basic nitrogen of 1.30 percent (53 percent conversion of available epoxide).

EXAMPLE 11

Amination of Ultravis 30® Epoxide (Ex. 3) with Ethylenediamine.

To a 1 L Parr bomb equipped with a mechanical stirrer were added 100 g of Ultravis 30 epoxide (0.9 percent oxirane oxygen), 58.3 g of ethylenediamine, and 10.0 g of alumina. The vessel was closed and purged with nitrogen. The reaction was heated to 245° C. (200 psi) while stirring.

This temperature was maintained for 18 hours. The reaction was then cooled to room temperature, and the reaction mixture was separated from the alumina catalyst. The reaction product was dissolved in 200 ml of chloroform and washed three times with 500 ml of water. The organic layer was stripped of solvent to yield 83.8 g of product with a percent basic nitrogen of 1.13 percent (56 percent conversion of available epoxide).

EXAMPLE 12

Amination of Ultravis 30® Epoxide (Ex. 3) with Diethylenetriamine without Catalyst.

To a 1 L Parr bomb equipped with a mechanical stirrer were added 72.0 g of Ultravis 30 epoxide (1.1 percent oxirane oxygen) and 73.0 g of diethylenetriamine. The vessel was closed and purged with nitrogen. The reaction was heated to 245° C. (35 psi) while stirring. This temperature was maintained for 18 hours. The reaction was then cooled to room temperature. The reaction product was dissolved in 150 ml of chloroform and washed twice with 200 ml of water. The organic layer was stripped of solvent to yield 70.0 g of product with a percent basic nitrogen of 2.16 percent (79 percent conversion of available epoxide.)

EXAMPLE 13

A 300 gallon stainless steel reactor was charged with 396 lbs. of Parapol® 1300. The polybutene was heated to 80° C. and 5.5 lbs. of glacial acetic acid and 198 lbs. of heptane were added. A mixture of 0.21 lbs. of 85 percent phosphoric acid and 0.15 lbs. of 50 percent sulfuric acid was prepared. This acid mixture and 29.6 lbs. of 70 percent hydrogen peroxide were added simultaneously to the stirred reaction mixture over a period of one hour while maintaining the temperature between 79–84° C. After the addition was completed, the reaction was stirred for an additional six hours while the temperature was maintained at 80° C. At the end of this time, the agitation was stopped, and the lower aqueous layer was dropped. The product layer was washed by adding 600 lbs. of deionized water and agitating the mixture at 60° C. for 15 minutes. The agitation was then stopped, and the lower layer was dropped. The product was then washed again with an additional 600 lbs. of deionized water. The product solution was heated to 110° C., and the heptane was distilled off. As the distillation slowed, 26 inches of vacuum was applied to the reactor, and the temperature was increased to 140° C. to strip the last of the solvent off of the product. The stripped product was then dropped to a stainless steel drum and weighed. This reaction gave 395 lbs. of polybutene epoxide with 1.03 percent oxygen as oxirane (98 percent yield).

EXAMPLE 14

A 50 gallon reactor was charged with 130 lbs. of Parapol® 1300 epoxide (Example 13) and 122.7 lbs. of diethylenetriamine. The reactor was purged with nitrogen and then sealed. The reaction mixture was heated to 220° C. which gave a pressure of 15 psi. The reaction mixture was stirred at this temperature for 18 hours. Afterwards, the reaction was then cooled to 65° C., and the agitator was stopped. After 30 minutes the lower diethylenetriamine layer was dropped. The upper product layer was dissolved in 65 lbs. of xylene. The xylene solution was washed by charging the reactor with 130 lbs. of water. This wash mixture was heated to 60° C., and stirred for 15 minutes. The agitation was then stopped, and the lower aqueous layer was dropped. A second water wash was performed with another 130 lbs. of water. The organic layer was then stripped of xylene to yield a product having 1.51 percent basic nitrogen (57.5 percent conversion of the available epoxide). The amount of halogen or chlorine within the Examples was nondetectable.

EXAMPLE 15

A 300 gallon stainless steel reactor charged with 364.1 lbs. of Ultravis 30® polybutene was heated to 80° C., and 5.1 lbs. of glacial acetic acid was added. The reaction mixture was diluted by adding 187 lbs. of xylene. A mixture of 0.35 lbs. of 85 percent phosphoric acid and 0.25 lbs. of 50 percent sulfuric acid was prepared. This mixture and 27.3 lbs. of 70 percent hydrogen peroxide were added to the stirred reaction mixture over a period of one hour while maintaining the temperature at about 80° C. After the addition was completed, the reaction was stirred for an additional six hours while maintaining the temperature at 80° C. After the reaction was complete, the agitation was stopped, and the lower aqueous layer was dropped. The product layer was washed by adding 568 lbs. of deionized water and agitating the mixture at 60° C. for 15 minutes. The agitation was then stooped, and the lower layer was dropped. The product was then washed again with an additional 568 lbs. of deionized water. The product solution was heated to 110° C., and the xylene was distilled off. As the distillation slowed, 26 inches of vacuum was applied to the reactor, and the temperature was increased to 140° C. to strip the last of the solvent off the product. The stripped product was then dropped to a stainless steel drum and weighed. This reaction gave 360 lbs. of polybutene epoxide with 1.07 percent oxygen as oxirane (97.8 percent yield, 88 percent conversion.)

EXAMPLE 16

A 50 gallon reactor was charged with 130 lbs. of Ultravis 30 epoxide (Example 15) and 60 lbs. of diethylenetriamine. The reactor was purged with nitrogen and then sealed. The reaction mixture was heated to 220° C. which gave a pressure of 15 psi. The reaction mixture was stirred at this temperature for 18 hours. Afterwards the reaction was then cooled to 65° C., and the agitator was stopped. After 30 minutes the lower diethylenetriamine layer was dropped. The upper product layer was dissolved in 65 lbs. of xylene. The xylene solution was washed by charging the reactor with 130 lbs. of water. This wash mixture was heated to 60° C., and stirred for 15 minutes. The agitation was then stopped, and the lower aqueous layer was dropped. A second water wash was performed with another 130 lbs. of water. The organic layer was then stripped of xylene to yield a product having 1.89 percent basic nitrogen (70.5 percent conversion of the available epoxide).

EXAMPLE 17

In a 1 L flask equipped with a mechanical stirrer, a reflux condenser, and an addition funnel were placed 300 g of Amoco Polypropylene 9013 (Mn=885), 150 g of toluene, and 6.1 g of glacial acetic acid. This solution was heated to 80° C. A mixture of 0.81 g of 85 percent phosphoric acid, 0.58 g of 50 percent sulfuric acid, and 36 g of 70 percent hydrogen peroxide was placed in the addition funnel. The peroxide solution was added dropwise to the reaction mixture over a period of one hour. After the addition, the reaction was stirred at 80° C. for six hours. The reaction was then quenched with 250 ml of water. The organic layer was then washed two additional times with 250 ml of water. The organic layer was then stripped of the toluene to yield 303.7 g of the Polypropylene 9013 epoxide with 1.09 percent oxygen as oxirane (61 percent conversion).

EXAMPLE 18

In a 1 L flask equipped with a mechanical stirrer, a reflux condenser, and an addition funnel were placed 300 g of Amoco Polypropylene 9012 (Mn=740), 150 g of toluene, and 7.3 g of glacial acetic acid. This solution was heated to 80° C. A mixture of 0.89 g of 85 percent phosphoric acid, 0.64 g of 50 percent sulfuric acid, and 39.4 g of 70 percent hydrogen peroxide was placed in the addition funnel. The peroxide solution was added dropwise to the reaction mixture over a period of one hour. After the addition, the reaction was stirred at 80° C. for six hours. The reaction was then quenched with 250 ml of water. The organic layer was then washed two additional times with 250 ml of water. The organic layer was then stripped of the toluene to yield 312.1 g of the Polypropylene 9012 epoxide with 1.95 percent oxygen as oxirane (91.9 percent conversion).

EXAMPLE 19

To a 1 L Parr bomb equipped with a mechanical stirrer were added 96.7 g of Polypropylene 9013 epoxide (with 1.09 percent oxygen as oxirane) and 100 g of diethylenetriamine. The vessel was closed and purged with nitrogen. The reaction was heated to 245° C. (35 psi) while stirring. This temperature was maintained for 18 hours. The reaction was then cooled to room temperature. The reaction product was dissolved in 300 ml of toluene and washed twice with 250 ml of water. The organic layer was stripped of solvent to yield 80.0 g of product with a percent basic nitrogen of 1.06 percent (38 percent conversion of available oxirane).

EXAMPLE 20

To a 1 L Parr bomb equipped with a mechanical stirrer were added 106 g of Polypropylene 9013 epoxide (with 1.09 percent oxygen as oxirane) and 100 g of dimethylaminopropylamine. The vessel was closed and purged with nitrogen. The reaction was heated to 245° C. (150 psi) while stirring. This temperature was maintained for 18 hours. The reaction was then cooled to room temperature. The reaction product was dissolved in 300 ml of toluene and washed twice with 250 ml of water. The organic layer was stripped of solvent to yield 101.7 g of product with a percent basic nitrogen of 0.5 percent (26.7 percent conversion of available oxirane).

EXAMPLE 21

To a 1 L Parr bomb equipped with a mechanical stirrer were added 114 g of Polypropylene 9012 epoxide (with 1.95 percent oxygen as oxirane) and 105.8 g of triethylenetetramine. The vessel was closed and purged with nitrogen. The reaction was heated to 245° C. while stirring. This temperature was maintained for 18 hours. The reaction was then cooled to room temperature. The reaction product was dissolved in 300 ml of toluene and washed twice with 250 ml of water. The organic layer was stripped of solvent to yield 112.3 g of product with a percent basic nitrogen of 2.25 percent (35.1 percent conversion of available oxirane).

EXAMPLE 22

To a 1 L Parr bomb equipped with a mechanical stirrer were added 99.6 g of Polypropylene 9012 epoxide (with 1.95 percent oxygen as oxirane) and 96.7 g of ethylenediamine. The vessel was closed and purged with nitrogen. The reaction was heated to 245° C. (220 psi) while stirring. This temperature was maintained for 18 hours. The reaction was then cooled to room temperature. The reaction product was dissolved in 300 ml of toluene and washed twice with 250 ml of water. The organic layer was stripped of solvent to yield 97.2 g of product with a percent basic nitrogen of 1.35 percent (40.8 percent conversion of available oxirane).

Generally, hydroxypolypropylene amines and hydroxypolybutene amines having high amounts of basic nitrogen content therein such as at least above 0.4, 0.8, or 1.0 percent, often above 1.3 or 1.5 percent, and even above 1.8 or 2.0 percent can readily be achieved up to a value of about 4 percent, 6 percent, 8 percent, and even 9 or 10 percent by weight. As apparent from the above examples, high yields of hydroxypolybutene amines were obtained.

While in accordance with the Patent Statutes, the best mode and preferred embodiment has been set forth, the scope of the invention is not limited thereto, but rather by the scope of the attached claims.

What is claimed is:

1. A process for preparing a halogen-free hydroxypolyalkene amine composition comprising:

first reacting a polyalkene with hydrogen peroxide in the presence of acetic acid and a mixed mineral acid catalyst consisting essentially of phosphoric acid and sulfuric acid;

reacting the resulting epoxidized polyalkene at a temperature of from about 230° to about 300° C. in a closed vessel at a pressure of up to about 2.1 MPa, 300 psi, with an amine compound in an excess of said amine compound of from about 2 to 20 moles per mole of said epoxidized polyalkene;

wherein said polyalkene is selected from the group consisting of polybutene having a number average molecular weight of from about 400 to about 2200 and polypropylene having a number average molecular weight of from about 170 to about 2200;

wherein said epoxidized polyalkene is selected from the group consisting of epoxidized polybutene and epoxidized polypropylene;

wherein said amine compound is selected from the group consisting of diamines and polyamines and mixtures thereof, said amines providing at least one primary or secondary amino group;

wherein the mole ratio of acetic acid added to hydrogen peroxide is up to 0.3:1;

the mole ratio of hydrogen peroxide added to said polyalkene is at least 1.8:1;

the mole ratio of said acetic acid to polyalkene is up to about 0.4:1;

the mole ratio of phosphoric acid to sulfuric acid in said mixed mineral acid catalyst ranges between 2:1 to 3:1; and wherein the mole ratio of said mixed mineral acid catalyst to said polyalkene ranges between 0.0025:1 and 0.03:1.

2. A process according to claim 1, wherein the molecular weight of said polybutene is from about 700 to about 1,600, and wherein the molecular weight of said polypropylene is from about 290 to about 1,900.

3. A process according to claim 2, wherein said amine compound is selected from the group consisting of dimethylaminopropylamine, ethylenediamine, polyethylene polyamines and mixtures thereof.

4. A process according to claim 1, including converting at least 15 percent of said epoxidized polyalkene.

5. A process according to claim 1, wherein said step of first reacting provides an epoxidized polyalkene having a degree of epoxidation of at least 60 percent.

6. A polyalkene amine product produced by the process of claim 1.

7. A process according to claim 1, wherein said reaction temperature is from about 230° to 285° C.

8. A process according to claim 2, wherein said excess amine ratio is from about 4 to about 16.

9. A process according to claim 1, wherein said halogen-free hydroxypolyalkene amine composition has a reacted basic nitrogen content of at least 0.8 percent by weight.

* * * * *

UNITED STATES PATENT AND TRADEMARK OFFICE
CERTIFICATE OF CORRECTION

PATENT NO.    : 6,262,310 B1
DATED         : July 17, 2001
INVENTOR(S)   : James L. Dever, Larry J. Baldwin and Cyril J. Yaggi It is certified that error appears in the above-identified patent and that said Letters Patent is hereby corrected as shown below:

<u>Column 20,</u>
Line 36, after the word "polyalkylene;", the following language is to be inserted:

-- and recovering said halogen-free hydroxy polyalkene amine composition; wherein said halogen-free hydroxy polyalkene amine composition has a reacted basic nitrogen content of at least 0.4 and up to about 10 percent by weight; --

Signed and Sealed this

Sixteenth Day of July, 2002

*Attest:*

*Attesting Officer*

JAMES E. ROGAN
*Director of the United States Patent and Trademark Office*